(12) United States Patent
Ahonen

(10) Patent No.: US 8,147,071 B2
(45) Date of Patent: Apr. 3, 2012

(54) PROCESSOR FOR AN APPARATUS, AN APPARATUS AND ASSOCIATED METHODS

(75) Inventor: Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 458 days.

(21) Appl. No.: 12/387,313

(22) Filed: Apr. 29, 2009

(65) Prior Publication Data

US 2010/0277656 A1 Nov. 4, 2010

(51) Int. Cl.
*G02B 21/36* (2006.01)
*G03B 21/00* (2006.01)
*G03B 1/00* (2006.01)
*H04N 5/222* (2006.01)
*H04N 3/22* (2006.01)
*H04N 3/26* (2006.01)

(52) U.S. Cl. ..... 353/39; 353/121; 352/176; 348/333.06; 348/745

(58) Field of Classification Search ............. 353/39, 353/121; 352/176; 348/333.06, 745
See application file for complete search history.

(56) References Cited

U.S. PATENT DOCUMENTS 7,500,758 B1 * 3/2009 Adachi et al. ............. 353/101
2006/0256298 A1 * 11/2006 Knipe ....................... 353/69

* cited by examiner

*Primary Examiner* — Georgia Y Epps
*Assistant Examiner* — Magda Cruz

(57) ABSTRACT

Described herein is processor for providing image data signalling to a projector. The provided image data signalling represents an image to be projected by the projector. The processor comprises both an input to receive movement signalling associated with movement of the projector, and an output configured to provide image data signalling to the projector. The processor is also configured to provide image data signalling to the projector based on received movement signalling.

14 Claims, 10 Drawing Sheets

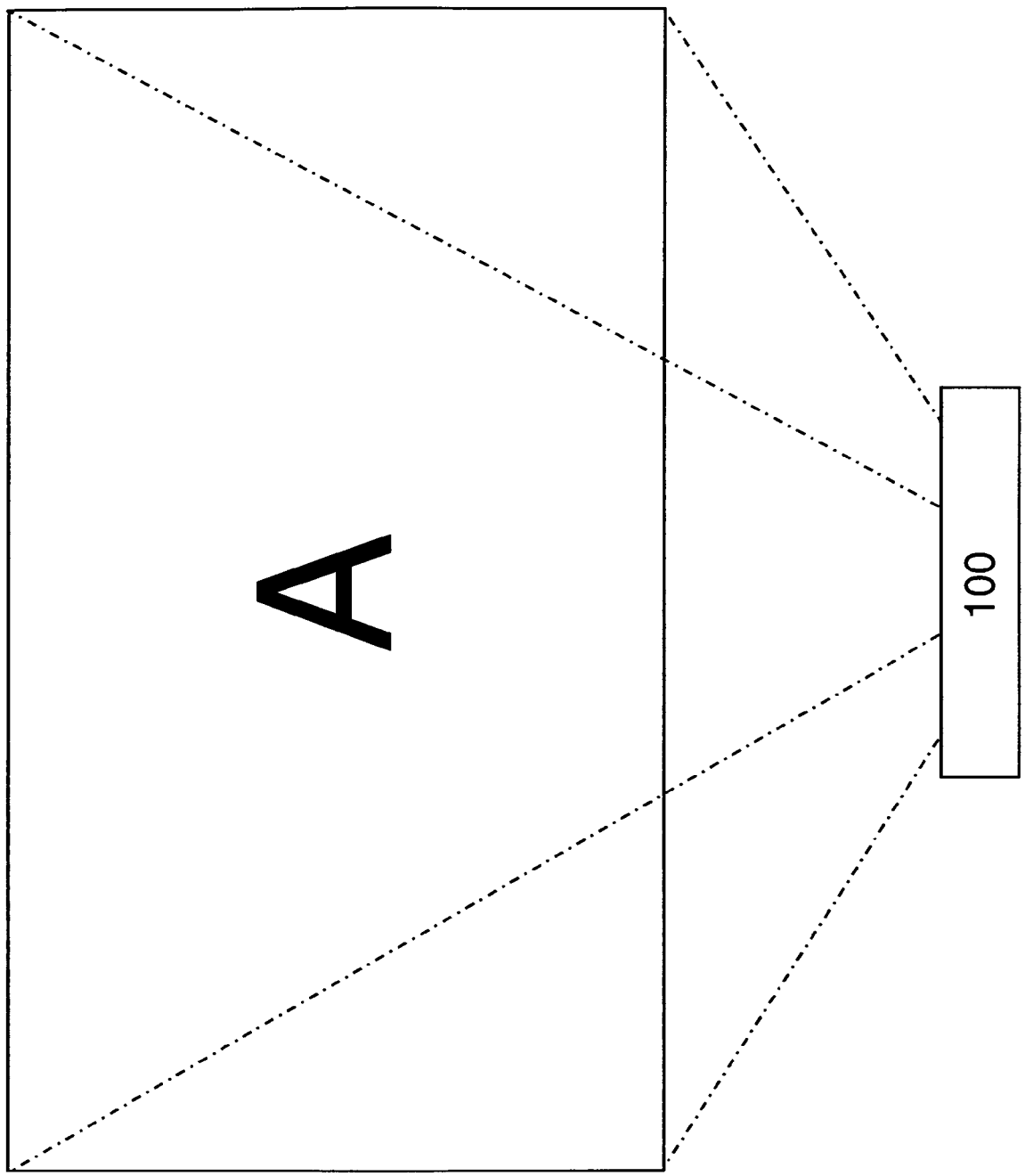

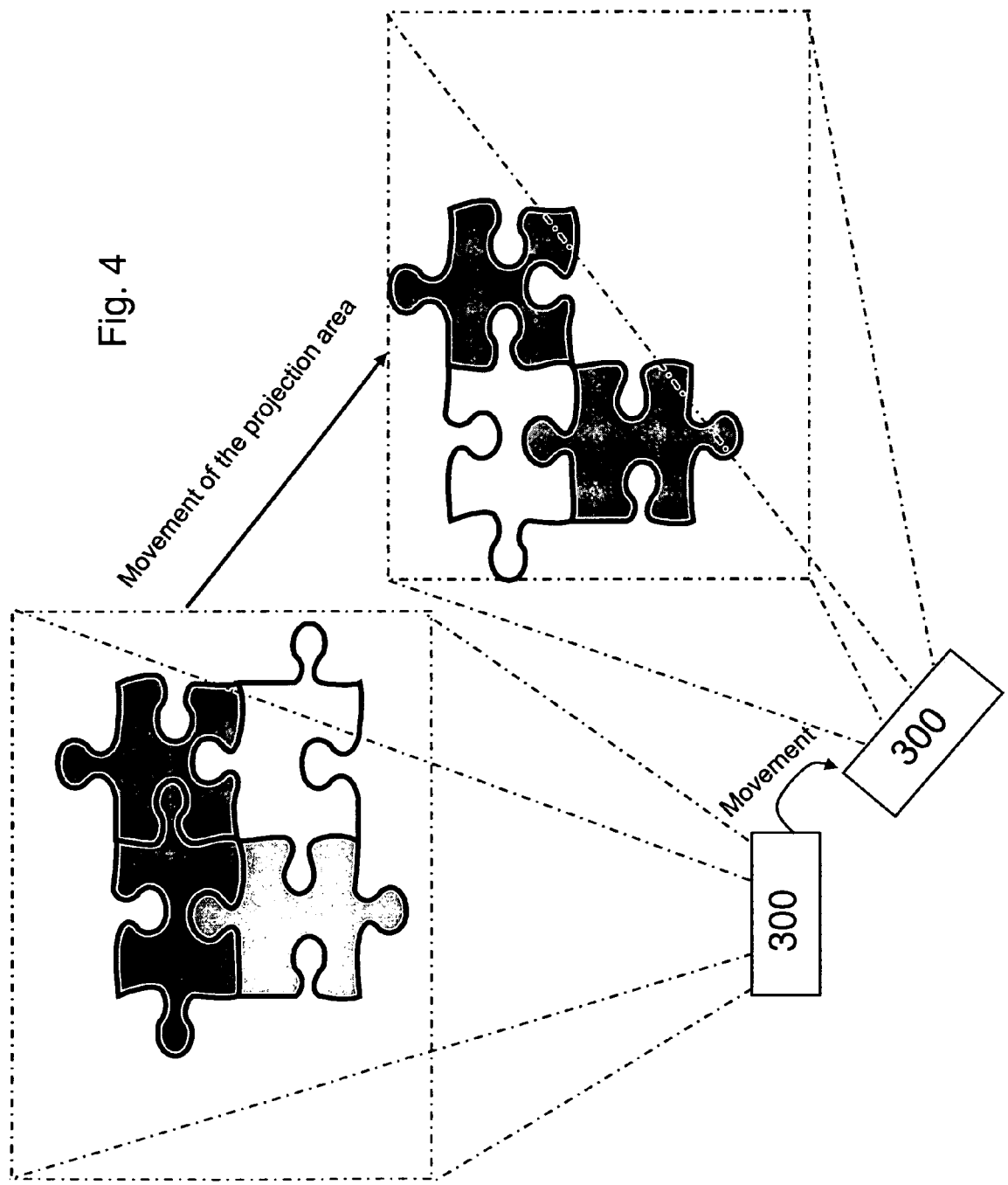

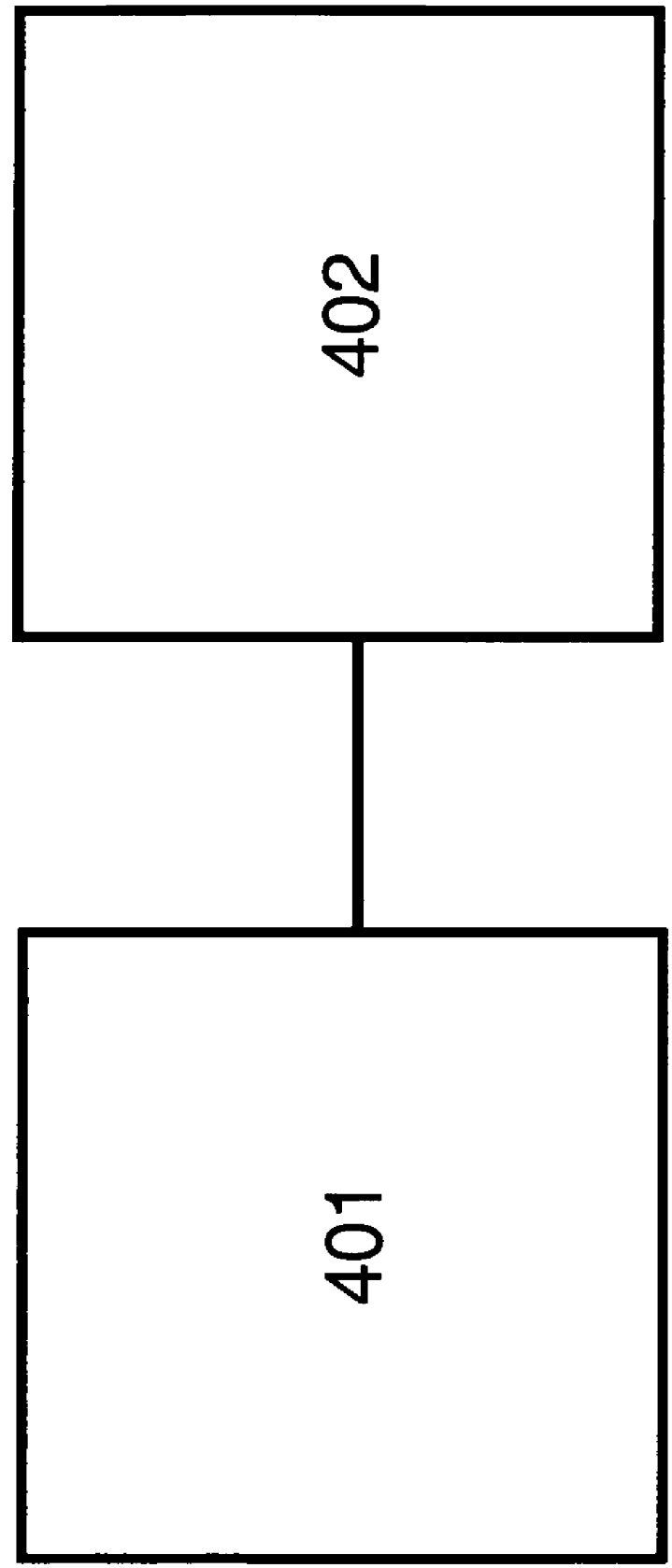

US 8,147,071 B2

PROCESSOR FOR AN APPARATUS, AN APPARATUS AND ASSOCIATED METHODS

TECHNICAL FIELD

The present disclosure relates to the field of projecting images and sensing movement, as well as associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

There are a number of different devices known in the art that are capable of creating and allowing interaction with virtual environments. Examples of these include near-to-eye glasses, helmets, and gloves. However, these are complicated and expensive, and not well suited for everyday use.

Microprojector technology has advanced considerably in the recent years, and microprojectors are now capable of being implemented in mobile phones such that they may be hand-held in use. However, there is little in the way of prior art for providing devices that can utilise microprojectors to create virtual environments.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided a processor for providing image data signalling to a projector, the image data signalling representing an image to be projected by the projector, the processor comprising:

an input to receive movement signalling associated with movement of the projector; and an output configured to provide image data signalling to the projector, and wherein the processor is configured to provide image data signalling to the projector based on received movement signalling.

This arrangement is capable of allowing the processor to interpret the movement signalling as an instruction to provide image data signalling that may correspond in some way to the movement experienced by the projector.

The movement signalling may provide an indication of one or more movement criterion of the projector, the movement criterion representing one or more of displacement and movement speed of the projector, and wherein the processor is configured to discriminate a movement criterion and to provide associated image data signalling to project associated image data.

The movement criterion may be linear movement along the projection axis, linear displacement with respect to the projection axis, displacement in one or more directions orthogonal to the projection axis, curvilinear displacement with respect to the projection axis, rotational displacement about the projection axis, and tilting displacement.

The movement criterion may be speed of linear movement along the projection axis, speed of linear displacement with respect to the projection axis, speed of displacement in one or more directions orthogonal to the projection axis, speed of curvilinear displacement with respect to the projection axis, speed of rotational displacement about the projection axis, and speed of tilting displacement.

By providing these movement criterion in the movement signalling, the processor is capable of recognising one or more of different types of movement/combinations of types of movement of the apparatus. In certain embodiments, the processor can have a large number of associations between image data signalling to be provided and corresponding movement(s) of the apparatus.

The movement signalling may be associated with movement of optical projection circuitry of the projector, the optical projection circuitry being configured to be usable to project an image represented by image data signalling provided by the processor.

The particular image data for a particular movement criterion may correspond to an image associated with one or more of a particular function within an application, or one of a plurality of different applications, to be projected by the projector.

The particular image data for a particular movement criterion may correspond to an image associated with a particular function within an application to be projected by the projector.

The particular image data for a particular movement criterion may correspond to an image associated with one of a plurality of different applications to be projected by the projector.

These features can allow projector movement to control particular functions of an application, or control selection of a particular application itself.

The particular image data for a particular movement criterion may correspond to an image associated with part of a larger image, and wherein movement of the projector provides for scanning across to and projection of respective parts of the larger image.

The movement of the projector may provide for incremental scanning across to and projection of respective parts of the larger image.

The movement of the projector may provide for continuous scanning across to and projection of respective parts of the larger image.

This allows portions of an image to be revealed by scanning the projected area of the projector across a real physical area. The movement of the projector is translated into movement signalling and a corresponding scanning of the image data to be projected is performed.

In a further aspect, there is provided an apparatus comprising the processor according to the first aspect, and a movement sensor configured to detect movement of the apparatus and/or a projector, and wherein the movement sensor is configured to provide corresponding movement signalling to the processor.

The apparatus may comprise a projector, or it may even be a projector. The movement sensor may therefore be configured to detect movement of the projector.

The apparatus may be a module for a projector.

In a further aspect, there is provided a processor for providing image data signalling to a means for projecting images, the image data signalling representing an image to be projected by the means for projecting images, the processor comprising:

a means for inputting to receive movement signalling associated with movement of the means for projecting images; and a means for outputting configured to provide image data signalling to the means for projecting images, and wherein the processor is configured to provide image data signalling to the means for projecting based on received movement signalling.

In a further aspect, there is also provided a method of providing image data signalling to a projector, the image data signalling representing an image to be projected by the projector, the method comprising:

receiving movement signalling associated with movement of the projector; and providing image data signalling to the projector based on received movement signalling.

In a further aspect, there is also provided a computer readable medium comprising computer program code configured to, when executed by one or more processors, cause an apparatus to perform at least:

receiving movement signalling associated with movement of a projector; and providing image data signalling to the projector based on received movement signalling.

In a further aspect, there is provided a user interface configured to be connected to the processor of the first aspect, the user interface configured to be operable to configure the processor to provide image data signalling to the projector based on received movement signalling. This allows for a user to control the configuration of the processor to customise the association between movement of the projector and given image data (to be signalled).

In a further aspect, there is provided an apparatus comprising:

at least one processor according to the first aspect, and

At least one memory including computer program code, the at least one memory and the computer program code configured to, working with the at least one processor, cause the apparatus to perform at least:

receiving movement signalling associated with movement of the projector; and providing image data signalling to the projector based on received movement signalling.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIGS. 2a-2c illustrate how movement signalling can be used to change/control the image data signalling provided to the projector.

FIG. 4 illustrates how movement signalling can be used to project images that correspond to part of a larger image.

FIG. 5 shows a flowchart of the method of operation.

DESCRIPTION OF SPECIFIC ASPECTS/EMBODIMENTS

In one or more embodiments described herein there is provided a processor for providing image data signalling to a connected projector based on received movement signalling, said movement signalling being associated with movement of the projector. The movement signalling enables the processor to change the image data being signalled/provided to the projector based on the nature of the detected movement of the projector. Users of the projector can therefore control the images projected by moving the projector itself, making for a simple, easy and intuitive method of controlling the projector. The response of the processor to movement of the projector can also be configured by the user to yield a more customisable interaction between the user and the projector.

Figure 1:
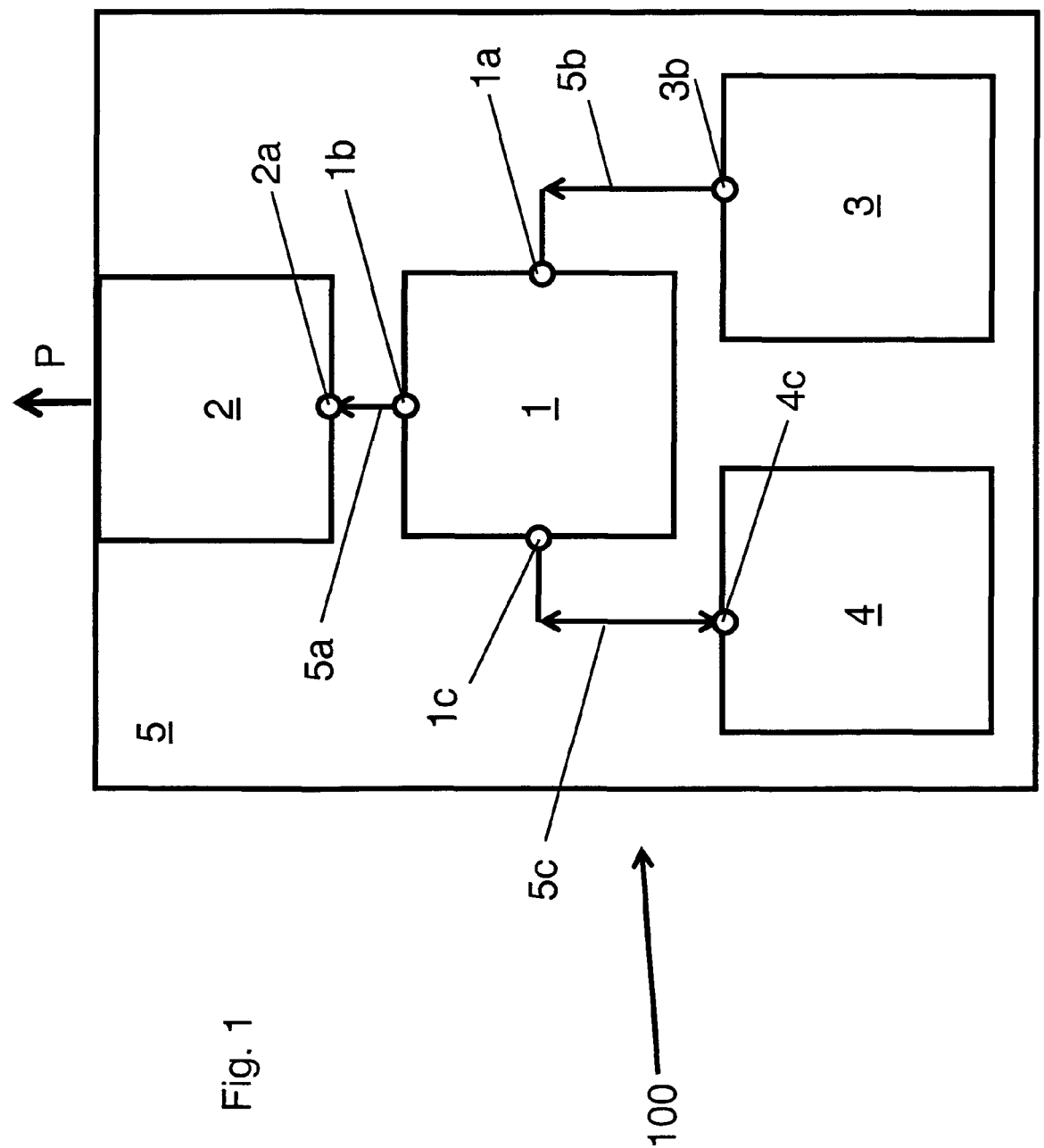
FIG. 1 shows a diagram of components of the processor of the first aspect in an apparatus of a further aspect.

FIG. 1 shows a diagram of such a processor 1 in combination with the connected projector 2. In this embodiment, the projector 2 is a micro-projector. This figure also illustrates an apparatus 100 which is provided with this processor 1 to effect control of the connected projector 2 using the processor 1. The apparatus 100 comprises the processor 1, projector 2, movement sensor 3, user interface 4 and printed circuit board (PCB) 5.

The processor 1 is an integrated circuit (specifically an Application Specific Integrated Circuit—ASIC) having an input 1a, an output 1b and a user interface connection 1c. The input 1a is configured to be connected to the movement sensor 3 and to receive movement signalling that is provided by the movement sensor 3. The output 1b is configured to be connected to the projector 2 and to provide image data signalling as an output signal. The image data signalling represents an image or images to be projected by the projector 2. The interface connection 1c is an input/output connection that is to be connected to the user interface 4. This is configured to allow the user interface 4 to configure the processor 1 in a user-desired way.

The processor 1 also comprises further electrical input/output connections (not shown) that are configured to be connectable to a power supply, memory for storing data (for images for example), user input/output such as a display or keypad etc (also not shown). It should be noted that whilst in this embodiment the processor 1 is an ASIC, it may also be a general purpose central processing unit (CPU) that is configured to be able to perform a variety of other tasks (for example, a CPU in a hand-portable electronic device such as a mobile telephone, PDA, or the like), or the configured functionality may be provided by a plurality of separate integrated circuits. A computer readable medium (memory device) may be connected to or provided within a CPU embodiment of the processor 1 with computer program code stored thereon for carrying out the method of the present invention.

As mentioned above, in this embodiment the projector 2 is a micro-projector. This is a smaller projecting unit than is found in, for example, home theatre size projectors. The projector 2 is of such a size that it is capable of being easily moved by a user's hand, in that it is hand portable. The projector 2 has an input 2a configured to receive image data signalling from the processor 1. The projector 2 is also configured to use received image data signalling to project an image represented by said image data signalling. The projector 2 can utilise different types of projection technology such as digital light processing (DLP), liquid crystal on silicon (LCOS), light emitting diode projectors, etc in order to project said image/images.

The movement sensor 3 is, in this embodiment, an accelerometer configured to be able to detect its own movement. In particular, it is configured to be able to detect its own direction of movement and displacement. The detected displacement may be the path that the accelerometer has been moved along/through. This could be a linear/straight path, such as linear displacement with respect to the projection axis; displacement in one or more directions orthogonal to the projection axis, such as closer to or further away from an object on which images are to be projected; curvilinear displacement with respect to the projection axis; rotational displacement about the projection axis, such as angling, as well as tilting displacement. The movement sensor 3 comprises an output 3b. The movement sensor 3 is configured to provide movement signalling that is associated/representative of the detected movement of the apparatus 100 using said output 3b.

The user interface 4 comprises a processor interface connection 4c which is configured to be connected to the processor 1 and to provide for input/output communication with the processor. The user interface 4 also comprises a user input/output area (not shown) utilising a keypad (input) and a display (output), or, in other embodiments, a touch sensitive display (providing for both user input and output). The user interface 4 is configured to be operable via the input/output area to control the configuration of the processor 1 via said connection 4c. By configuring the processor 1 to associate particular image data with a particular movement criterion represented/indicated by received movement signalling it is possible to tailor/customise the response of the processor 1 to respond in a particular way given a particular movement. This user interface 4 allows a user to customise the response of the processor 1.

The printed circuit board 5 has mounting locations (not shown) for each respective component. The printed circuit board comprises surface electrical connections 5a, 5b & 5c (or bus lines) configured to connect the respective inputs 1a, 2a; outputs 1b, 3b; and interface connections 1c, 4c of the processor 1, projector 2, movement sensor 3 and the user interface 4.

The components 1-4 are mounted onto the printed circuit board 5 via their respective mounting locations. In this embodiment all of the components 1-4 are directly soldered onto the surface of the printed circuit board 5, however in another embodiment the processor 1 is push-fit into a push-fit IC receiver (not shown) comprised by the printed circuit board 5 provided on the appropriate mounting location for the processor 1.

In this embodiment, the projector 2 is positioned at the top end (relative to the Figure) of the printed circuit board 5 to ensure that the projection axis P is not blocked by any of the components 1, 3 & 4. In other embodiments, the projector 2 may represent digital processing circuitry of a projector, and the optical projection circuitry that actually performs the image projection may be located elsewhere, whilst still being connected (by wires or wirelessly) to the digital processing circuitry. In such an embodiment, the digital processing circuitry may be likened to a remote control for the projector, controlling the images to be projected by movement of the apparatus. In such embodiments, the movement sensor 3 may be configured to detect movement of the optical projection circuitry and/or the digital processing circuitry. In still other embodiments, the optical projection circuitry of the projector is actually stationary, while the processor is provided in a remote control, movement of remote control effecting control of the image data signalling provided by the processor.

As shown, the output 3b of the movement sensor 3 is connected to the input 1a of the processor 1 via the respective surface connection 5b of the PCB 5. The processor interface connection 4c of the user interface 4 is electrically connected to the user interface connection 1c of the processor 1 via surface connection 5c of the PCB 5. The output 1b of the processor 1 is electrically connected to the input 2a of the projector 2 via surface connection 5a of the PCB 5. It should be noted that while in this embodiment the components are mounted on a printed circuit board, they may of course be provided on alternate connective substrates or materials such as a printed wiring board (PWB), or they may be connected using normal wires (for example, point-to-point wiring).

The apparatus 100 also comprises a housing (not shown) in which the printed circuit board 5 and all the mounted the components 1-4 are mounted. The housing is configured to ensure that it does not obstruct the projection axis P of the projector 2, and to encapsulate all the components 1-4 and the PCB 5. The housing is also provided with user interface elements to allow for user input/output using the user input/output area of the user interface 4.

Now that we have described the structure of this embodiment we will now describe the functionality offered by said structure.

As the movement sensor 3 is mounted to the apparatus 100, the movement sensor 3 is capable of detecting movement of the apparatus 100 (and projector 2). The movement sensor 3 is therefore capable of detecting the same movement criterion mentioned above for the apparatus 100. The movement signalling that the movement sensor 3 is configured to provide to the processor 1 is therefore representative of and associated with the movement of the apparatus 100 (and projector 2). The movement sensor 3 provides said movement signalling to the processor 1 via output 3b, along surface connection 5b.

The processor 1 receives the movement signalling from the movement sensor 3 via input 1a. The processor 1 is configured to provide image data signalling to the projector 2 based on said received movement signalling, the movement signalling being provided via output 1b and surface connection 5a. The projector 2 receives this via its input 2a.

In this embodiment, the processor 1 is configured to have associations between image(s) and corresponding movement criterion. This provides for a corresponding link between a detected movement criterion representing physical movement of the projector and an image represented by image data signalling. This means that, upon detection of a given movement criterion, the processor 1 will provide the associated image data signalling to the projector 2 to project said image associated with the detected movement.

Figure 2B:
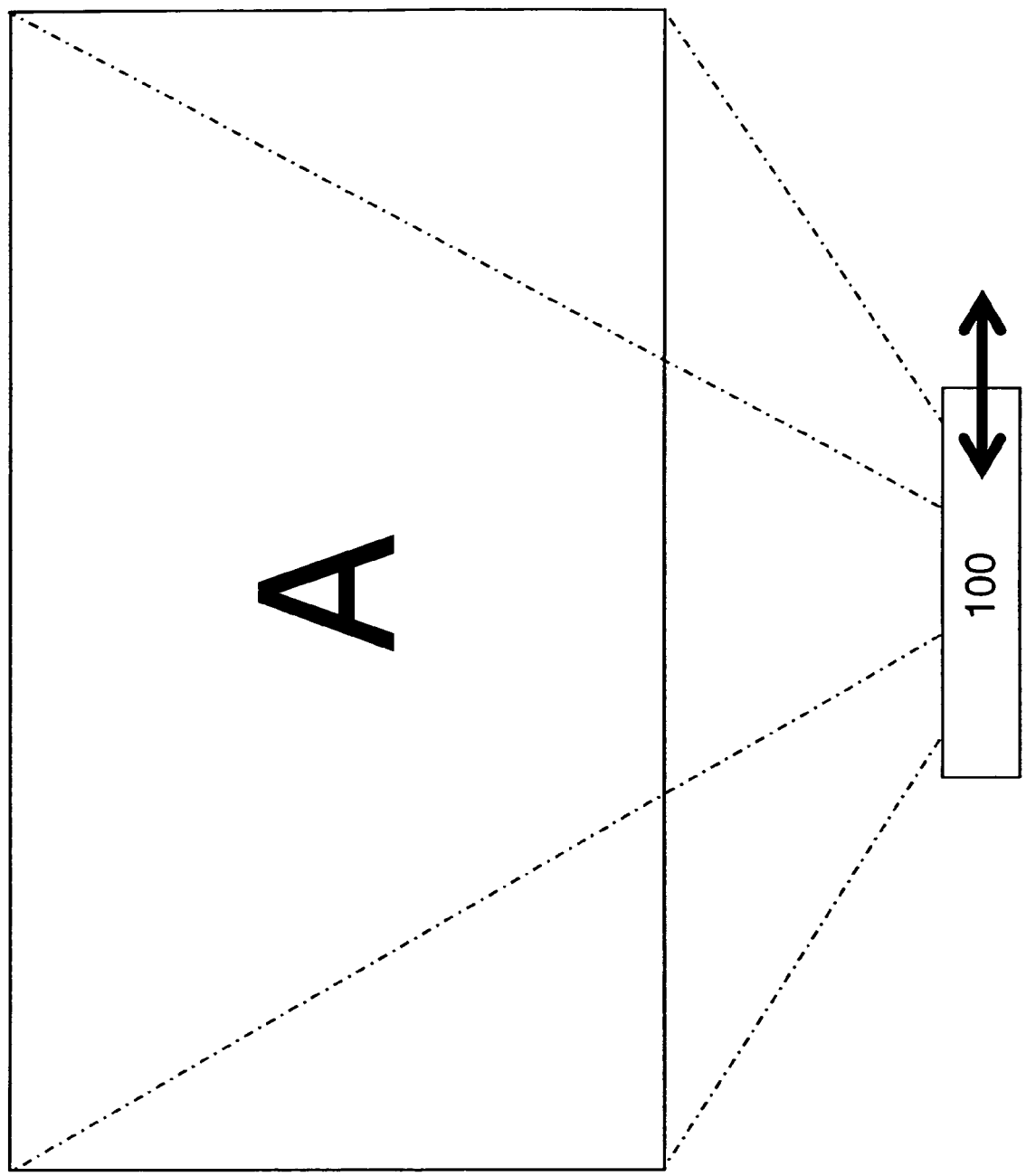
Figure 2C:
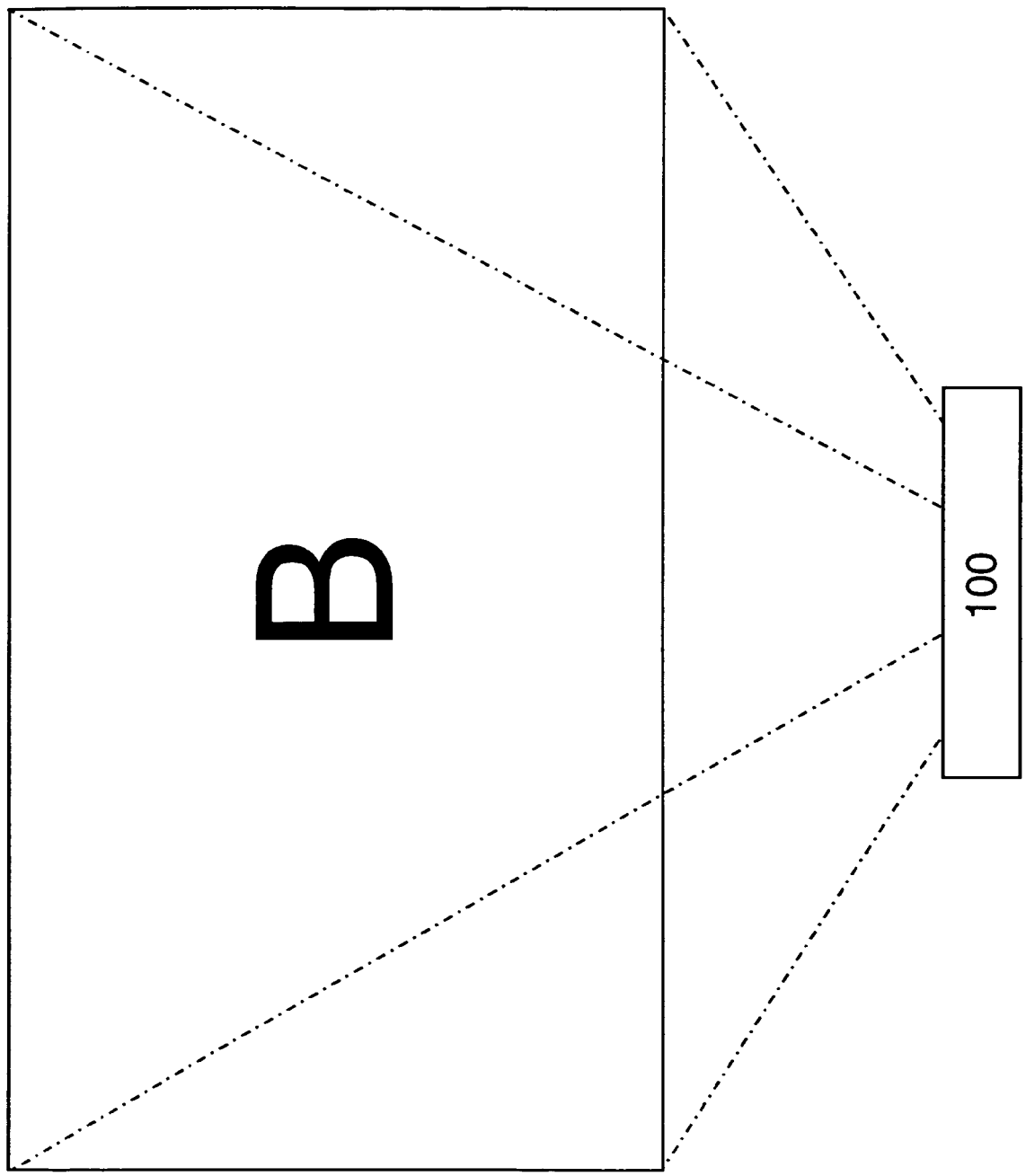

Reference is now made to FIGS. 2a, 2b and 2c. These illustrate the operation a first embodiment of the apparatus 100.

In this embodiment, the processor 1 is provided with image data representing a number of stored images of an application (e.g. Powerpoint™) in a set. There is an order to the images of the set in a manner similar to a slideshow. In the figures, the set has a first image 'A' and a second image 'B'. The processor 1 is configured to have an association between directional movement of the apparatus 100 (via said received movement signalling) and movement between image data representing the images to be projected. By this it is meant that the processor 1 will provide image data signalling for the next or previous image in the image set upon receiving movement signalling associated with such an instruction. In this embodiment, an abrupt movement of the apparatus to the right causes an incremental (i.e. one image at a time) or continuous (i.e. smooth scrolling through the sequence of images) forward cycling through the image set whilst an abrupt movement of the apparatus to the left causes an incremental or continuous backward cycling through the image set (relative to the Figures). Repeated abrupt movements may provide for corresponding continuous scrolling through the set.

Shown in FIG. 2a, the processor 1 is causing the projector 2 to project image 'A' as no projector movement is experienced. FIG. 2b shows that the apparatus 100 experiences an abrupt movement to the right and back again to its approximate starting point. This movement of the apparatus 100 is translated into the movement signalling received by the processor 1. As shown in FIG. 2c, the processor 1 provides different image data signalling to the projector 2 upon detection of this movement. This different image data signalling causes the projector 2 to project image 'B', being the next image in the set. Reversing this operation (i.e. an abrupt movement of the apparatus to the left) will cause the processor 1 to cycle backwards through the image set. In other embodiments, there would not be a requirement for the movement to be abrupt, and/or for the movement signalling to be generated once the apparatus is again back near its starting point. The skilled person will also appreciate that other types of movement/movement criterion may be utilised and associated with cycling through the set in an incremental or continuous manner in accordance with the scope of the invention.

Other embodiments depicted in the figures have been provided with reference numerals that correspond to similar features of earlier described embodiments. For example, feature number 1 can also correspond to numbers 101, 201, 301 etc. These numbered features but may not have been directly referred to within the description of these particular embodiments. These have still been provided in the figures to aid understanding of the further embodiments, particularly in relation to the features of similar earlier described embodiments.

In another embodiment (not shown), a particular movement or movement criterion of the apparatus (e.g. the abrupt movements mentioned above) is directly associated with a particular image. For example, the first image of a set is associated with an abrupt movement of the apparatus to the left, the second image of the set is associated with an abrupt movement of the apparatus to the right, the third image is associated with an abrupt movement of the apparatus in an upwards direction etc. In such embodiments, the processor is configured to recognise such associations. As each image directly corresponds to a particular movement criterion, upon detection of a particular movement, the processor will provide the image data signalling of the image associated with the detected movement/movement criterion to the projector.

In another embodiment (not shown), the processor is provided with a number of applications, for example, a word processing application, database manager, spreadsheet program, mail program, etc. Each of these programs outputs image data representing that program in the same way that these programs would output image data to be displayed on the display of a personal computer, mobile phone, PDA, etc. As per the above two embodiments, the processor is configured to recognise an association between a particular movement of the apparatus and a particular application. Upon detection of this movement, the processor provides image data signalling representing/associated with the application linked with the detected movement to the projector to be projected. Accordingly, such an embodiment may provide for a function similar to that performed by executing "Alt+Tab" key combination in Windows™ by movement of the apparatus. Therefore, in some embodiments a particular movement may cause the processor to cycle through applications (as per the image 'slideshow' embodiment discussed three paragraphs above), or a particular movement may cause a specific application to be selected (as per the embodiment discussed in the paragraph above).

In a variation of the application embodiment above, the provided applications each have a plurality of different functions. For example, functions such as cut, copy, paste, scroll, zoom, select, edit, etc. Each of these functions can be considered to operate (to some extent) on the image being projected. As before, the processor 1 is configured to recognise an association between a particular movement of the apparatus and a particular function. Upon detection of this movement, the processor 1 selects the associated function and performs the operation of said function on the image. For example, an abrupt downward movement of the apparatus may represent an instruction to the processor to use a 'scroll down' function.

Figure 3A:
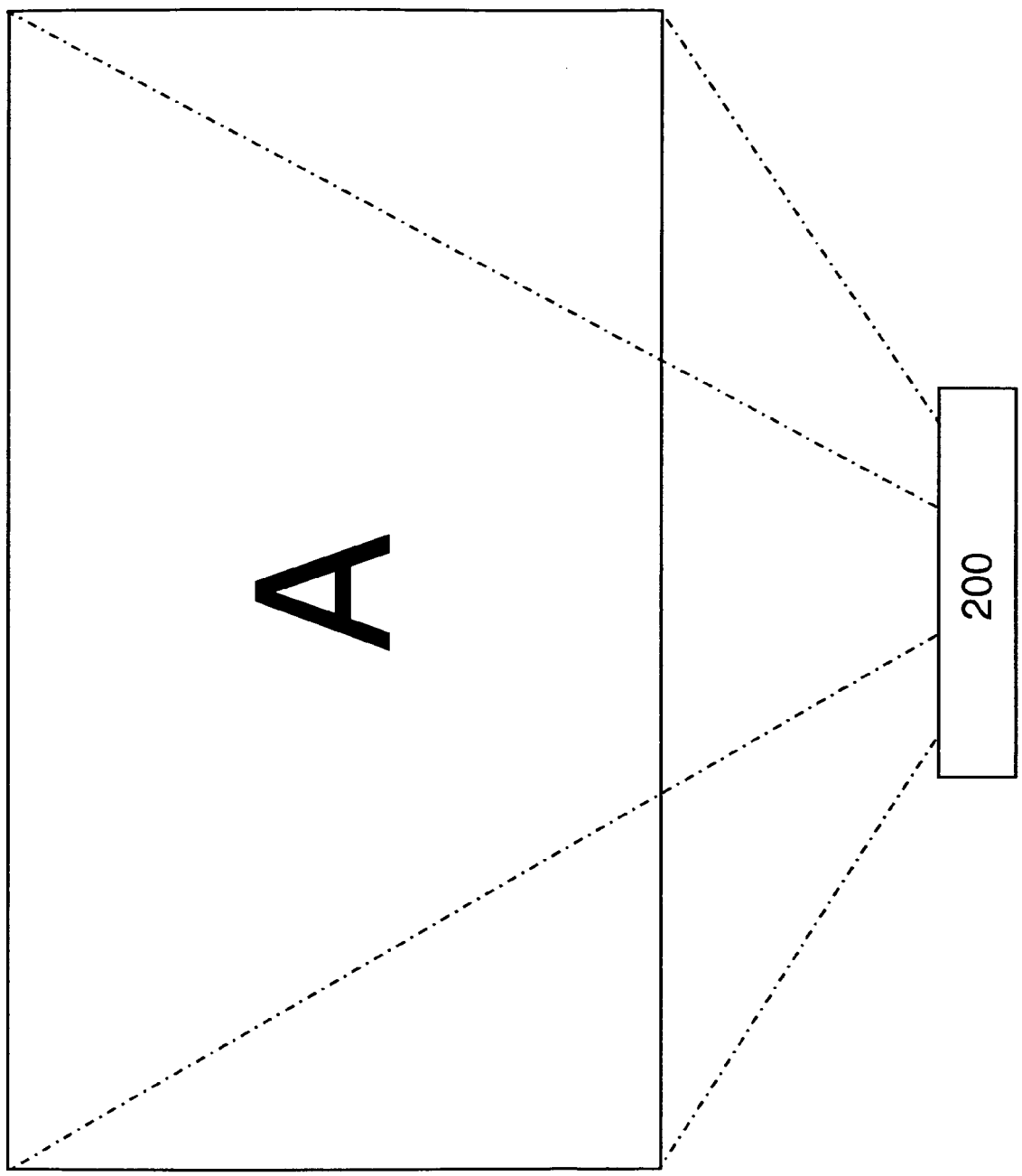
FIG. 3a-3c illustrate how movement signalling can be used to operate on the image data signalling projected by the projector.
Figure 3B:
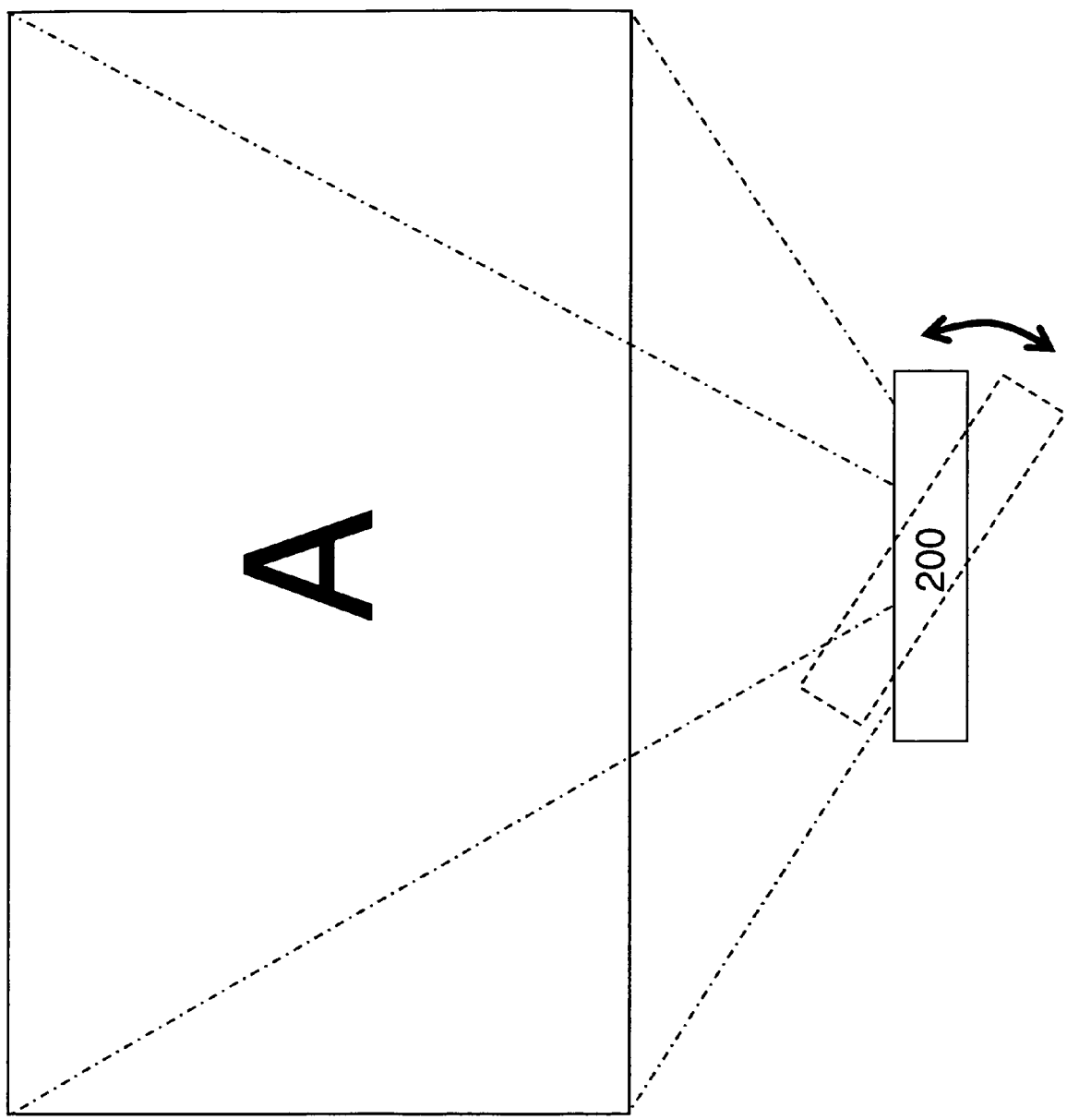
Figure 3C:
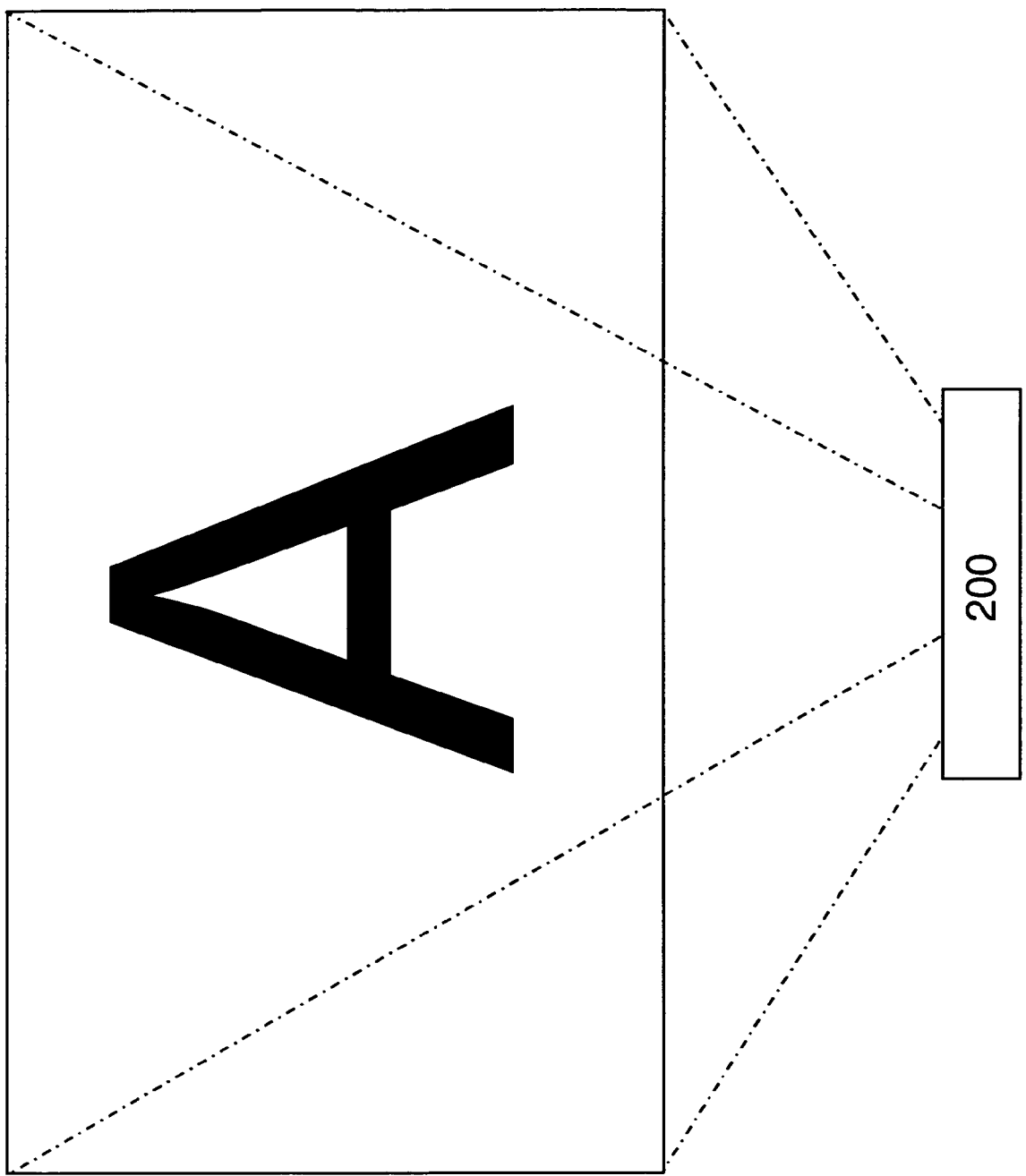

The skilled person will also appreciate that the use of such functions may also be applied to viewing images. For example, a tilting motion of the apparatus (or forward/backward motion of the apparatus relative to an initial starting position and/or relative to the user, or along the projection axis P, for example) may be associated with a 'zoom in/out' function, (e.g. a rightward tilting motion may be associated with a 'zoom in' function). This is illustrated in FIGS. 3a-3c. FIG. 3a shows that the processor 201 is causing the projector 202 to project image 'A'. FIG. 3b shows that the apparatus 200 experiences a tilting motion to the right associated with a 'zoom in' function. Upon detecting this movement, the processor 201 recognises the association between the movement and the zoom function, and provides image data signalling to the projector 202 that causes the projector 202 to project a magnified version of image 'A' in response to the associated movement instruction (FIG. 3c). In this embodiment, the longer the apparatus 200 experiences being tilted the greater the extent of the zoom performed by the apparatus 200. FIG. 3c shows that the projector 2 consequently projects the magnified image represented by the received image data signalling. The skilled person will appreciate that such functions can effect continuous operation on the projected image as in this embodiment, or they may effect discrete/incremental changes to the projected image. The skilled person will also appreciate that the ability to detect movement of the apparatus 200 via said movement sensor 203 can also be used to operate other functions.

Reference is now made to FIG. 4. In this embodiment, the processor 1 is configured to provide image data signalling representing an image that is part of a larger image. The totality of the larger image is not projected, but instead the processor projects part of/a portion of the image at any one time. The apparatus 300 experiences movement indicated by the arrows in the figure. This movement causes the projection axis P to be moved from its initial position. This results in the projection area of the projector 302 being moved to another area. The movement sensor 303 is configured to detect this movement and to provide movement signalling to the processor 301 that is representative of this movement. Upon detection of this movement signalling, the processor 301 changes the provided image data signalling in accordance with the movement experienced by the apparatus 300. This change in provided image data signalling is directly linked to the physical change in location of the projection area due to said movement. The processor is configured to select a different portion of the larger image by scanning across the image to select a different portion of the larger image. The extent of the scanning is directly proportional to the extent of the movement of the projection area due to movement of the apparatus.

Through doing this, it is possible to expose further portions of the larger image by movement of the projection area. It can be likened to moving a viewing window across a large image, the remainder of the image being hidden from view until the window passes over the desired portion of the image. This allows for exploring an image too large to be projected, or magnified scanning on an image to be inspected.

This operation can be implemented in a gaming application. For example, in the embodiment shown in FIG. 4, the image is that of an incomplete jigsaw. By moving the projector, and consequently the projection area, it is possible to expose and explore the full image to find remaining pieces and complete the jigsaw. This could also be implemented in a large spreadsheet application to thereby scan through further portions of the spreadsheet that would otherwise be very difficult to read when projected at a size that would enable reading of the data. The skilled person will appreciate that this operation can be applied in a number of different ways.

FIG. 5 illustrates the method of the first embodiment of providing image data signalling to a projector. The method involves receiving said movement signalling associated with movement of the projector (step 401; from the movement sensor in the first embodiment); and providing image data signalling to the projector (from the processor in the first embodiment) based on received movement signalling (step 402).

Figure 6:
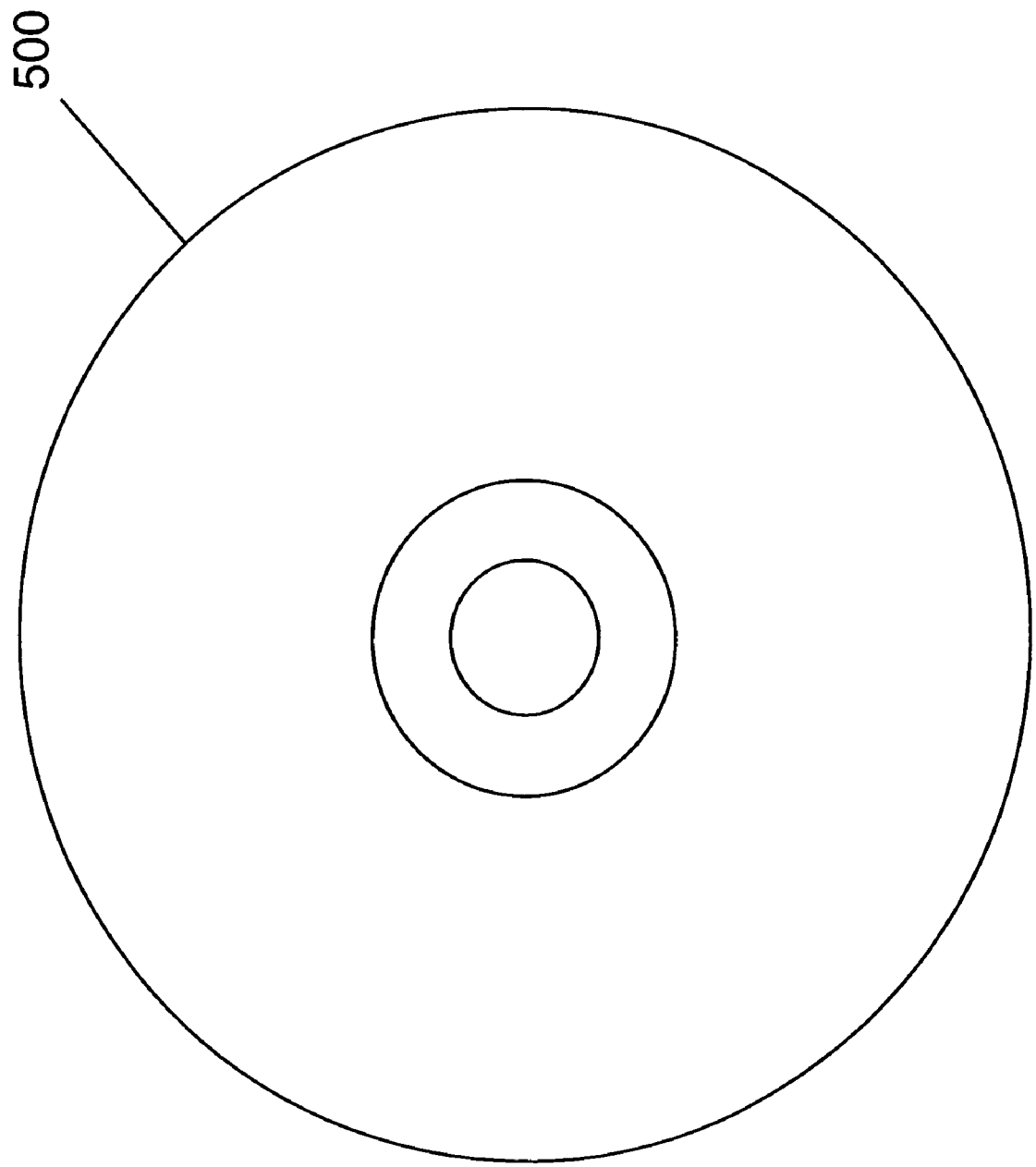
FIG. 6 shows a computer readable medium storing a computer program.

FIG. 6 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function. The media 500 may be connected to the processor 1 of FIG. 1.

The skilled person will appreciate that the apparatus of any one or more of these embodiments could be implemented in a portable electronic device such as a mobile phone, handportable projector, PDA, netbook type personal computer, a laptop etc. The skilled person will therefore appreciate that the apparatus may in fact be a projector, or the projector aspect may be a sub-aspect of the totality of the apparatus. The skilled person will also appreciate that the processor can be implemented in already existing apparatus that have both a projector and a movement sensor in order to provide the functionality of the above described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A processor for providing image data signalling to a projector, the image data signalling representing an image to be projected by the projector, the processor comprising:
   an input to receive movement signalling associated with movement of the projector; and
   an output configured to provide image data signalling to the projector, and wherein the processor is configured to provide image data signalling to the projector based on received movement signalling, wherein the movement signalling provides an indication of one or more movement criterion of the projector, the movement criterion representing one or more of displacement and movement speed of the projector, and wherein the processor is configured to discriminate a movement criterion and to provide associated image data signalling to project associated image data.

2. A processor according to claim 1, wherein the particular image data for a particular movement criterion corresponds to an image associated with one or more of a particular function within an application, or one of a plurality of different applications, to be projected by the projector.

3. A processor according to claim 1, wherein the particular image data for a particular movement criterion corresponds to an image associated with a particular function within an application to be projected by the projector.

4. A processor according to claim 1, wherein the particular image data for a particular movement criterion corresponds to an image associated with one of a plurality of different applications to be projected by the projector.

5. A processor according to claim 1, wherein the particular image data for a particular movement criterion corresponds to an image associated with part of a larger image, and wherein movement of the projector provides for scanning across to and projection of respective parts of the larger image.

6. A processor according to claim 5, wherein the movement of the projector provides for incremental scanning across to and projection of respective parts of the larger image.

7. A processor according to claim 5, wherein the movement of the projector provides for continuous scanning across to and projection of respective parts of the larger image.

8. A processor according to claim 1, wherein the projector is a micro-projector.

9. An apparatus comprising the processor of claim 1, and a movement sensor configured to detect movement of the apparatus and/or a projector, and wherein the movement sensor is configured to provide corresponding movement signalling to the processor.

10. The apparatus of claim 9, wherein:
    the apparatus is a projector, or the apparatus comprises a projector; and
    the movement sensor is configured to detect movement of the projector.

11. The apparatus of claim 9, wherein the apparatus is a module for a projector.

12. A user interface configured to be connected to the processor of claim 1, the user interface configured to be operable to configure the processor to provide image data signalling to the projector based on received movement signalling.

13. A method of providing image data signalling to a projector, the image data signalling representing an image to be projected by the projector, the method comprising:
    receiving movement signalling associated with movement of the projector; and
    providing image data signalling to the projector based on received movement signalling, wherein the movement signalling provides an indication of one or more movement criterion of the projector, the movement criterion representing one or more of displacement and movement speed of the projector, and wherein the processor is configured to discriminate a movement criterion and to provide associated image data signalling to project associated image data.

14. A computer readable medium comprising computer program code configured to, when executed by one or more processors, cause an apparatus to perform at least:
    receiving movement signalling associated with movement of a projector; and
    providing image data signalling to the projector based on received movement signalling, wherein the movement signalling provides an indication of one or more movement criterion of the projector, the movement criterion representing one or more of displacement and movement speed of the projector, and wherein the processor is configured to discriminate a movement criterion and to provide associated image data signalling to project associated image data.

* * * * *